(12) United States Patent
Chen et al.

(10) Patent No.: US 9,069,972 B2
(45) Date of Patent: Jun. 30, 2015

(54) SECURE DIGITAL CARD, AND SECURE DIGITAL CARD SYSTEM AND OPERATING METHOD

(71) Applicant: Silicon Motion, Inc., Jhubei (TW)

(72) Inventors: Hsiao-Yen Chen, Zhudong Township (TW); Cheng-Wei Liu, Taichung (TW); Hsu-Ping Ou, Zhubei (TW)

(73) Assignee: Silicon Motion, Inc., Jhubei (TW)

( * ) Notice: Subject to any disclaimer, the term of this patent is extended or adjusted under 35 U.S.C. 154(b) by 290 days.

(21) Appl. No.: 13/676,841

(22) Filed: Nov. 14, 2012

(65) Prior Publication Data

US 2013/0276130 A1    Oct. 17, 2013

(30) Foreign Application Priority Data

Apr. 11, 2012 (TW) ............................. 101112747 A

(51) Int. Cl.
*G06F 17/30* (2006.01)
*G06F 21/60* (2013.01)
*G06F 21/10* (2013.01)

(52) U.S. Cl.
CPC ................ *G06F 21/60* (2013.01); *G06F 21/10* (2013.01)

(58) Field of Classification Search
CPC ............ G06F 21/79; G06F 2212/2022; G06F 12/1466; G06F 21/00; G06F 2212/1052; G06F 3/0622; H04L 2209/60
See application file for complete search history.

(56) References Cited

U.S. PATENT DOCUMENTS

| 7,779,064 B2 * | 8/2010 | Phillips ......................... 709/201 |
| 2006/0015713 A1 | 1/2006 | Rhoads |
| 2006/0185006 A1 * | 8/2006 | Yu et al. ............................ 726/9 |
| 2007/0136523 A1 * | 6/2007 | Bonella et al. ................ 711/113 |
| 2007/0168564 A1 * | 7/2007 | Conley et al. ..................... 710/1 |
| 2009/0055562 A1 * | 2/2009 | Ito ................................ 710/105 |
| 2009/0055660 A1 * | 2/2009 | Cheng ........................... 713/193 |
| 2010/0281508 A1 * | 11/2010 | Poder et al. ..................... 725/93 |
| 2011/0119504 A1 * | 5/2011 | Nishimura .................... 713/193 |
| 2012/0254629 A1 * | 10/2012 | Zipperer et al. .............. 713/193 |
| 2013/0007393 A1 * | 1/2013 | Taki .............................. 711/163 |
| 2013/0198441 A1 * | 8/2013 | Ito ................................ 711/103 |
| 2014/0136855 A1 * | 5/2014 | Ducharme et al. ............. 713/193 |

FOREIGN PATENT DOCUMENTS

| TW | 200705197 | 2/2007 |
| TW | 200910364 A | 3/2009 |

OTHER PUBLICATIONS

Office Action of corresponding TW application, published on Apr. 8, 2014.

* cited by examiner

*Primary Examiner* — Farid Homayounmehr
*Assistant Examiner* — Lizbeth Torres-Diaz
(74) *Attorney, Agent, or Firm* — Wang Law Firm, Inc.; Li K. Wang; Stephen Hsu

(57) ABSTRACT

A Secure Digital (SD) card, and an system and an operating method for the SD card are disclosed. The disclosed SD card has a Flash memory and a controller. The Flash memory contains a data storage space and a Content Protection Recorded Media (CPRM) support space. The controller executes a firmware of the SD card, such that read/write commands provided from a host for the CPRM support space are regarded and executed as security commands and a CPRM mechanism is operated over the data storage space.

11 Claims, 7 Drawing Sheets

SECURE DIGITAL CARD, AND SECURE DIGITAL CARD SYSTEM AND OPERATING METHOD

CROSS REFERENCE TO RELATED APPLICATIONS

This Application claims priority of Taiwan Patent Application No. 101112747, filed on Apr. 11, 2012, the entirety of which is incorporated by reference herein.

BACKGROUND OF THE INVENTION

1. Field of the Invention

The present invention relates to a secure digital card (SD card) and an SD card system and operating method.

2. Description of the Related Art

Content Protection Recorded Media (CPRM) is a mechanism for controlling the copying, moving and deletion of a digital media. In conventional techniques, a card reader connecting an SD card to a host has to support CPRM for operating a CPRM mechanism over the SD card from the host side.

BRIEF SUMMARY OF THE INVENTION

A Secure Digital (SD) card, and an SD card system and operating method are disclosed.

An SD card in accordance with an exemplary embodiment of the invention comprises a Flash memory and a controller. The Flash memory provides a data storage space and a Content Protection Recorded Media (CPRM) support space. The controller provides and executes a firmware. Thus, read/write commands, instructed by a host, to the CPRM support space, are regarded as security commands for operating a CPRM mechanism over the data storage space.

In another exemplary embodiment, an SD card system is shown and comprises the aforementioned SD card and a host. The host executes application software to operate the SD card.

An SD card operating method in accordance with an exemplary embodiment of the invention comprises the following steps: allocating a Flash memory of an SD card to provide a data storage space and a Content Protection Recorded Media (CPRM) support space in the Flash memory; and regarding read/write commands that a host issues for the CPRM support space as security commands for operating a CPRM mechanism over the data storage space.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
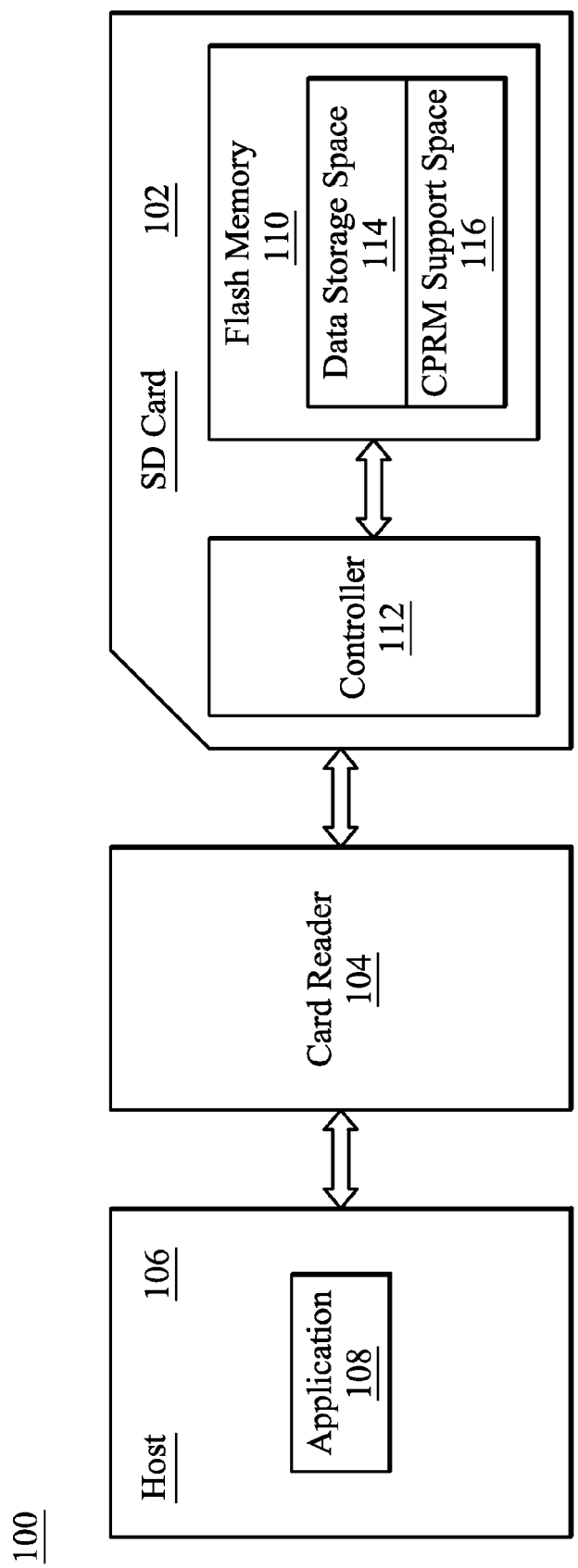
FIG. 1 depicts a Secure Digital card system 100 in accordance with an exemplary embodiment of the invention.

FIG. 1 depicts a Security Digital (SD) card system 100 in accordance with an exemplary embodiment of the invention. As shown, an SD card 102 is connected to a host 106 by a card reader 104. The host 106 executes software application 108 to operate the SD card 102 via the card reader 104.

The SD card 102 comprises a Flash memory 110 and a controller 112. The Flash memory 110 is allocated to provide a data storage space 114 and a Content Protection Recorded Media (CPRM) support space 116. The controller 112 provides and executes a firmware (may be stored in a ROM of the controller 112) to regard read/write commands that the host 106 issues for the CPRM support space 116 as security commands (defined according to a CPRM protocol) for operating a CPRM mechanism over the data storage space 114.

Figure 2:
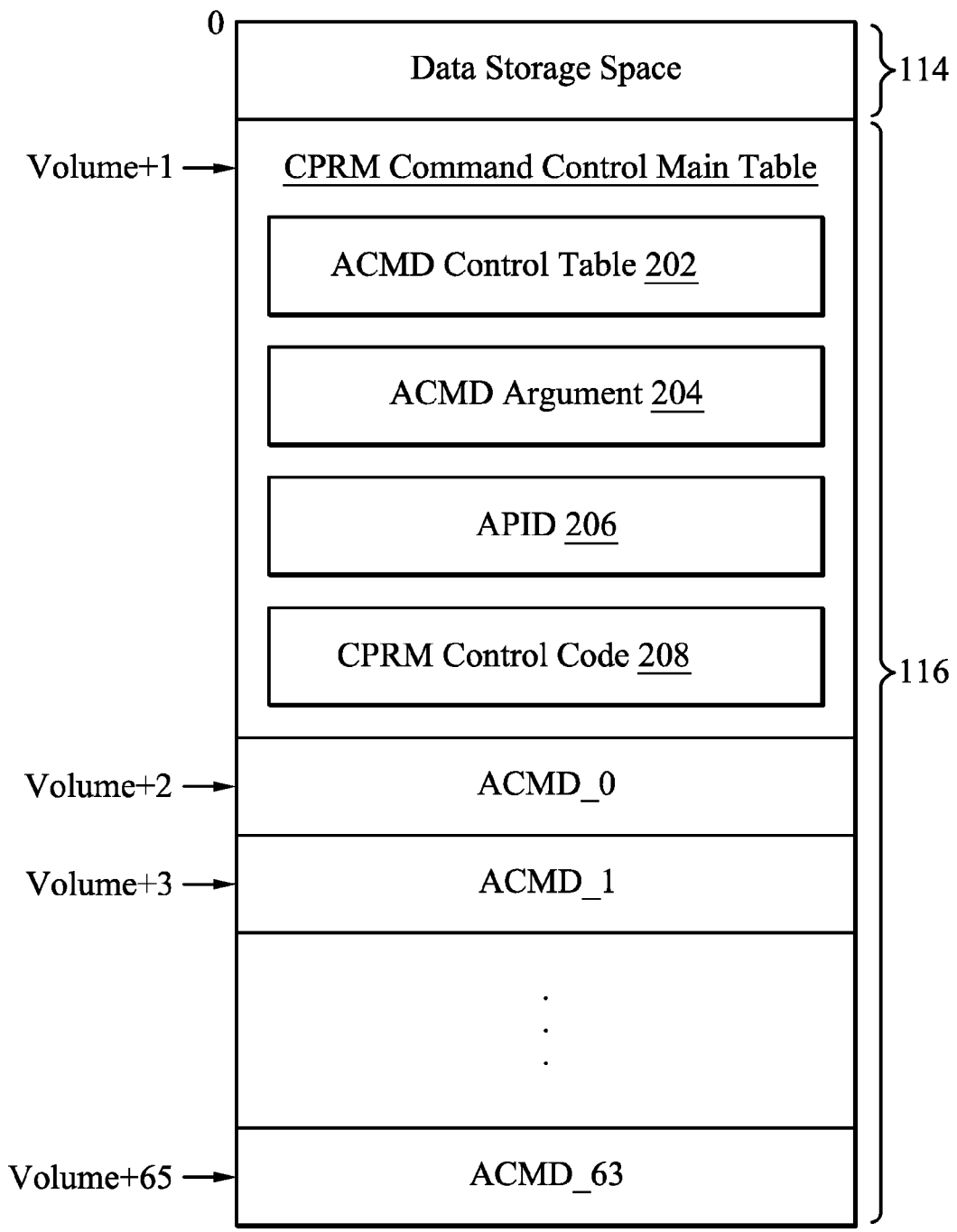
FIG. 2 depicts memory space allocation of the Flash memory 110.

FIG. 2 depicts the memory space allocation of the Flash memory 110 in detail. As shown, the data storage space 114 occupies a volume Volume, and, the CPRM support space 116 is from space (Volume+1) to space (Volume+65).

As shown in FIG. 2, within the CPRM support space 116, the space (Volume+1) is allocated to store a CPRM command control main table, and, the space (Volume+2) to space (Volume+65) are allocated to 64 security commands ACMD_0 to ACMD_63, respectively, as 64 different space cells forming the security command representative space. In an exemplary embodiment, the space (Volume+1) to space (Volume+65) each occupies 512 bytes. Thus, the size of the CPRM support space 116 is 512×65 bytes.

In space (Volume+1), the CPRM command control main table comprises:

an ACMD (application-specific command) control table 202, which is stored with the read/write attribution of every security command and may be filled out by the manufacturer;

an ACMD Argument 204, which is stored with parameters of the security commands and may be filled out according to the commands issued from the host 106;

an APID (an identifier for application) 206, which indicates whether the SD card 102 can support a CPRM mechanism with the CPRM support space 116, which may be filled out by the manufacturer; and A CPRM control code 208, which shows whether it is allowed to operate a CPRM mechanism over the SD card, which may be set by the host 106.

In an exemplary embodiment, each byte of the ACMD control table 202 corresponds to one security command and is in the following byte format:

| Bit 7 | Bit 6 | Bit 5 to Bit 0 |
|---|---|---|
| Read Flag | Write Flag | Number N, representing the security command ACMD_N |

Read Flag:
0, indicating that LBA (Volume+2+N) is non-readable;
1, indicating that LBA (Volume+2+N) is readable.

Write Flag:
  0, indicating that LBA (Volume+2+N) is non-writable;
  1, indicating that LBA (Volume+2+N) is writable.

In an exemplary embodiment, a CPRM mechanism may be operated when the CPRM control code 208 is 0XCC. When the CPRM control code 208 is not 0XCC, a CPRM mechanism is forbidden to be operated.

As for the security command representative space (from space (Volume+2) to space (Volume+65)), security commands corresponding thereto are:
  Get Media Key Block command, ACMD_43, corresponding to space (Volume+45)—a first space cell;
  Get Media ID command, ACMD_44, corresponding to space (Volume+46)—a second space cell;
  First Random Number Set command in an Authentication and Key Exchange (AKE) process, ACMD_45 (Set random number RN1 as challenge 1 in AKE process), corresponding to space (Volume+47)—a third space cell;
  Second Random Number Get command in the AKE process, ACMD_46 (Get random number RN2 as challenge 2 in AKE process), corresponding to a space (Volume+48)—a fourth space cell;
  Second Response Value Set command in the AKE process, ACMD_47 (Set RES2 as RESPONSE 2 to RN2 in AKE process), corresponding to space (Volume+49)—a fifth space cell;
  First Response Value Get command in the AKE process, ACMD_48 (Get RES1 as RESPONSE 1 to RN1 in AKE process), corresponding to space (Volume+50)—a sixth space cell;
  Change Secure Area command, ACMD_49, corresponding to space (Volume+51)—a seventh space cell;
  Secure Erase command, ACMD_38, corresponding to space (Volume+40)—a eighth space cell;
  Secure Write Multi-blocks command, ACMD_25, corresponding to space (Volume+27)—a ninth space cell;
  Secure Write Media Key Block command, ACMD_26, corresponding to space (Volume+28)—a tenth space cell; and
  Secure Read Multi-blocks command, ACMD_18, corresponding to space (Volume+20)—a eleventh space cell.

Figure 3:
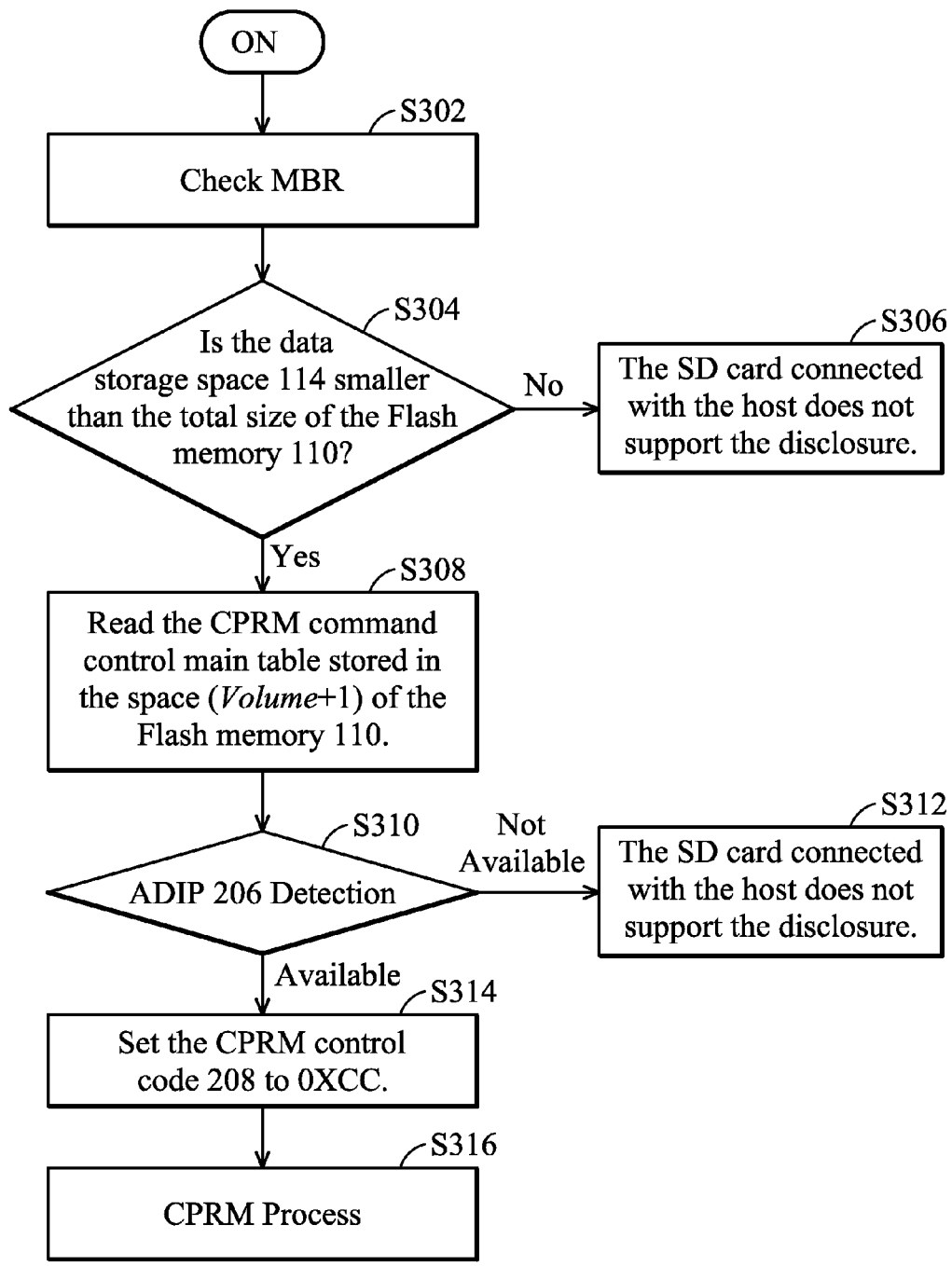
FIG. 3 shows a flowchart depicting the design of the application 108 executed by the host 106.
Figure 4:
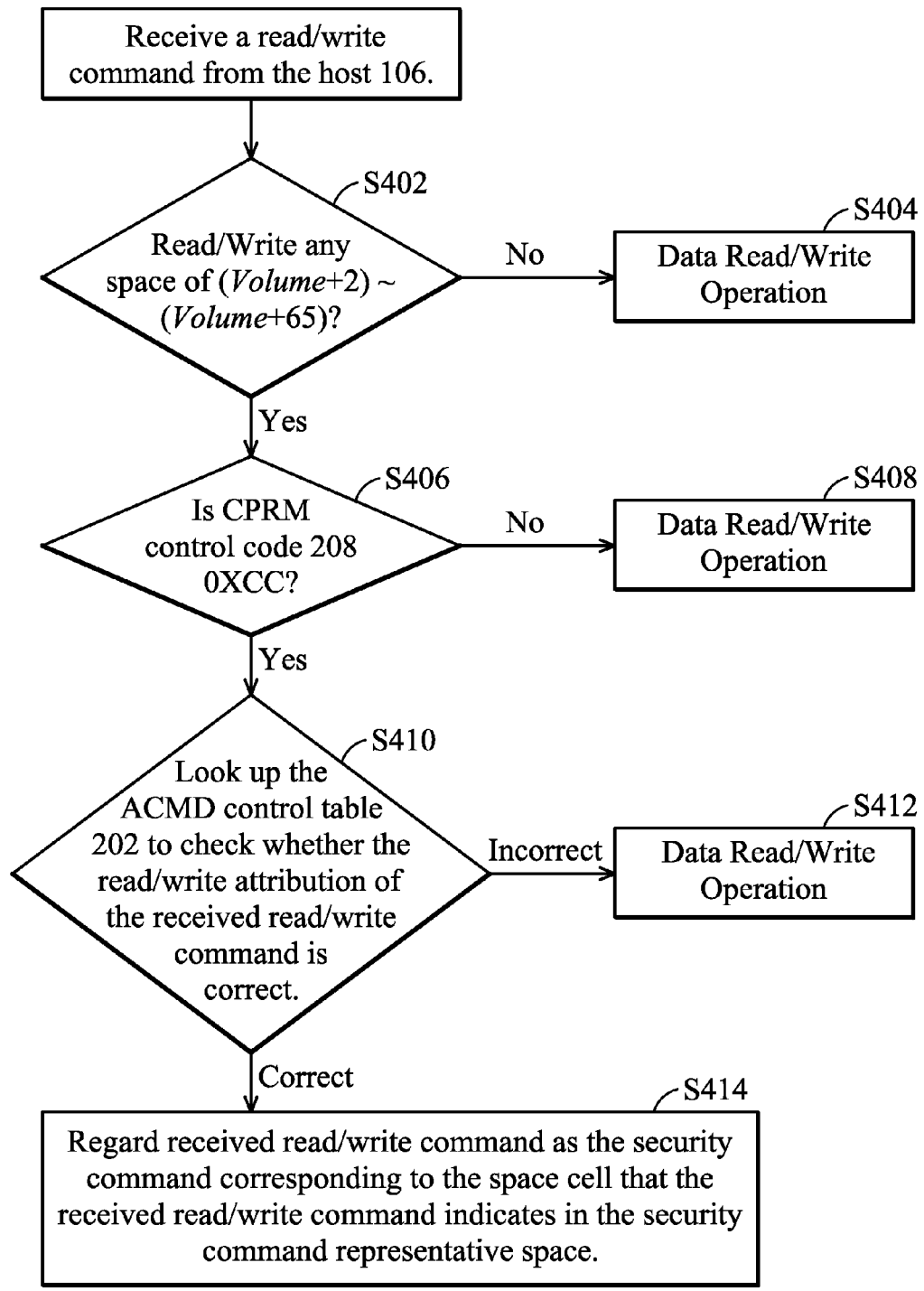
FIG. 4 shows a flowchart depicting the design of the firmware of the Secure Digital card 102.
Figure 5:
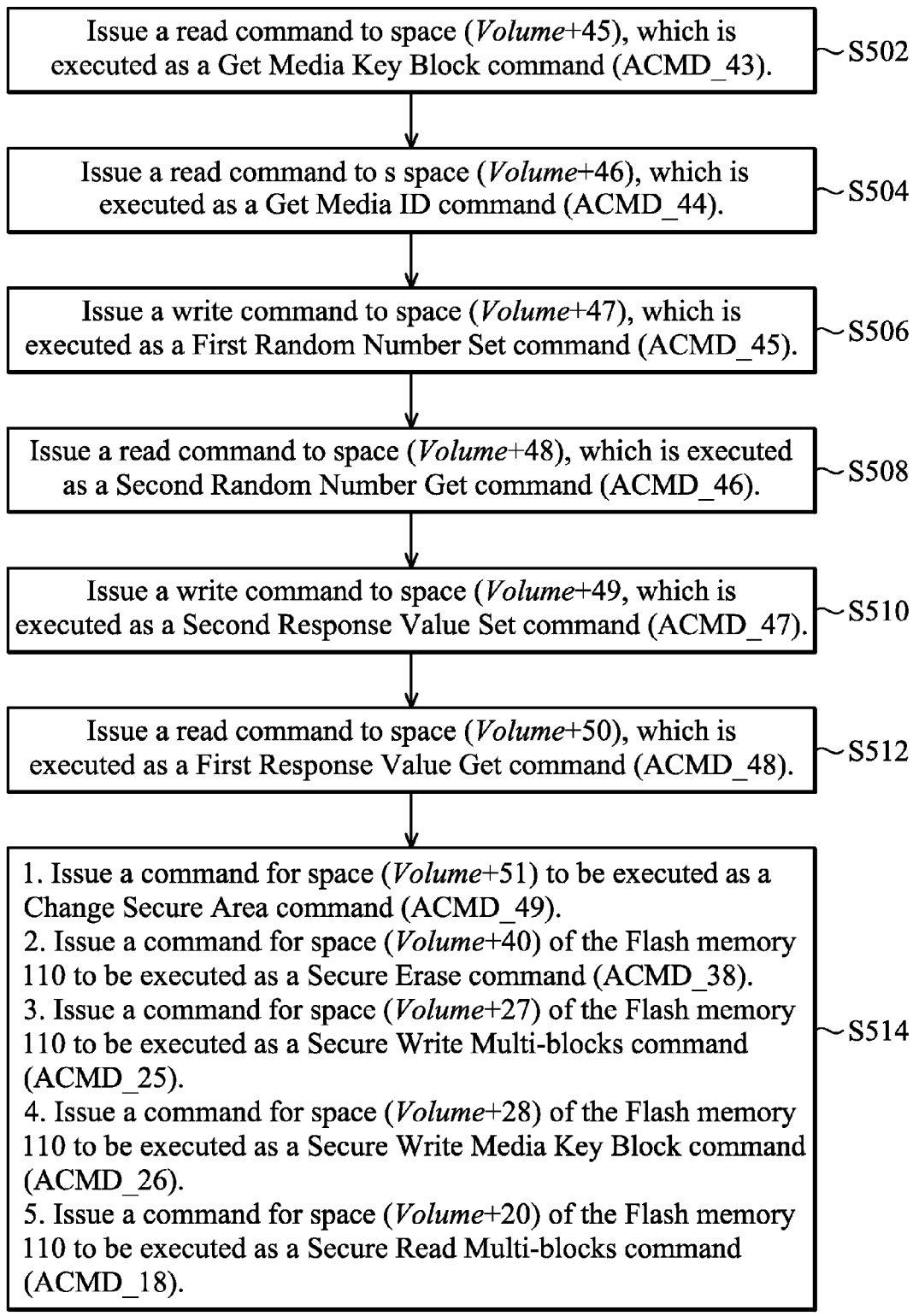
FIG. 5 depicts a CPRM process.

Based on the design of the CPRM support space 116, FIG. 3 shows how the application 108 executed by the host 106 works, FIG. 4 is a flowchart depicting the firmware design of the SD card 102, and FIG. 5 depicts a CPRPM process.

Referring to FIG. 3, the procedure of the application 108 starts from step S302, by which the master boot record (MBR) is checked. In step S304, it is determined whether the data storage space 114 is smaller than the total size of the Flash memory 110. When the data storage space 114 is not smaller than the total size of the Flash memory 110, the step S306 is performed according to the application 108, as it is determined that the SD card connected with the host 106 does not support the disclosure. On the contrary, when the data storage space 114 is smaller than the size of the flash memory 110, the step S308 is performed according to the application 108. In the step S308, the CPRM command control main table stored in the space (Volume+1) of the Flash memory 110 is retrieved. In step S310, detection of the APID 206 is performed. When no APID is available, the step S312 is performed according to the application 108, as it is determined that the SD card connected to the host 106 does not support the disclosure. When the APID 206 is available and indicates that the SD card 102 supports a CPRM mechanism with the CPRM support space 116, the step S314 is performed according to the application 108 to set the CPRM control code 208 to 0XCC. In a subsequent step S316, the CPRM mechanism is operated over the data storage space 114 of the flash memory 110 of the SD card 102 according to the application 108.

Referring to FIG. 4, at the SD card 102 side, when receiving a read/write command from the host 106, step S402 is performed according to the executed firmware to determine whether the received read/write command is to read/write the security command representative space (Volume+2)~(Volume+65). If not, the step S404 is performed, and a data read/write operation is performed according to the received read/write command (i.e., a normal read/write operation is performed to read/write the data storage space 114.) When the received read/write command is to read/write the security command representative space (Volume+2)~(Volume+65), the step S406 is performed. In step S406, it is checked whether the CPRM control code 208 is 0XCC. If not (which means that the CPRM mechanism is forbidden), the step S408 is performed to execute a data read/write operation according to the received read/write command, by which one space cell of the security command representative space is read/written according to the received read/write command (i.e., one of (Volume+2)~(Volume+65) is read/written). On the contrary, when the CPRM control code 208 is 0XCC (which means that the CPRM mechanism is allowed to be operated), the step S410 is performed to look up the ACMD control table 202 to check whether the read/write attribution of the received read/write command is correct. If the read/write attribution of the received read/write command is incorrect, the step S412 is performed to execute a data read/write operation according to the received read/write command, by which one space cell of the security command representative space is read/written according to the received read/write command (i.e., one of (Volume+2) (Volume+65) is read/written). When the read/write attribution of the received read/write command conforms to that recorded in the ACMD control table 202, step S414 is performed and the received read/write command is regarded as the security command corresponding to the space cell that the received read/write command indicates in the security command representative space.

FIG. 5 shows a flowchart depicting the CPRM process performed in the step S316 of FIG. 3. By executing the application 108, the host 106 performs steps S502 to S512 to output read/write commands to the SD card 102 for the first, second, third, fourth, fifth and sixth space cells of the security command representative space in order. After step S512, the host 106 performs step S514 to output one read/write command to the seventh, the eighth, the ninth, the tenth or the eleventh space cells of the security command representative space. According to the procedure introduced in FIG. 5, a CPRM mechanism is operated over the data storage space 114. The details of the steps S502 to S514 are discussed in the following paragraphs.

In step S502, a read command is issued to the flash memory 110 for the first space cell (Volume+45), wherein the read command is regarded as the Get Media Key Block command (ACMD_43) to be executed according to the firmware of the SD card 102.

In step S504, a read command is issued to the flash memory 110 for the second space cell (Volume+46), wherein the read command is regarded as the Get Media ID command (ACMD_44) to be executed according to the firmware of the SD card 102.

In step S506, a write command is issued to the flash memory 110 for the third space cell (Volume+47), wherein the write command is regarded as the First Random Number Set command (ACMD_45) to be executed according to the firmware of the SD card 102.

In step S508, a read command is issued to the flash memory 110 for the fourth space cell (Volume+48), wherein the read command is regarded as the Second Random Number Get command (ACMD_46) to be executed according to the firmware of the SD card 102.

In step S510, a write command is issued to the flash memory 110 for the fifth space cell (Volume+49), wherein the write command is regarded as the Second Response Value Set command (ACMD_47) to be executed according to the firmware of the SD card 102.

In step S512, a read command is issued to the flash memory 110 for the sixth space cell (Volume+50), wherein the read command is regarded as the First Response Value Get command (ACMD_48) to be executed according to the firmware of the SD card 102.

Figure 6A:
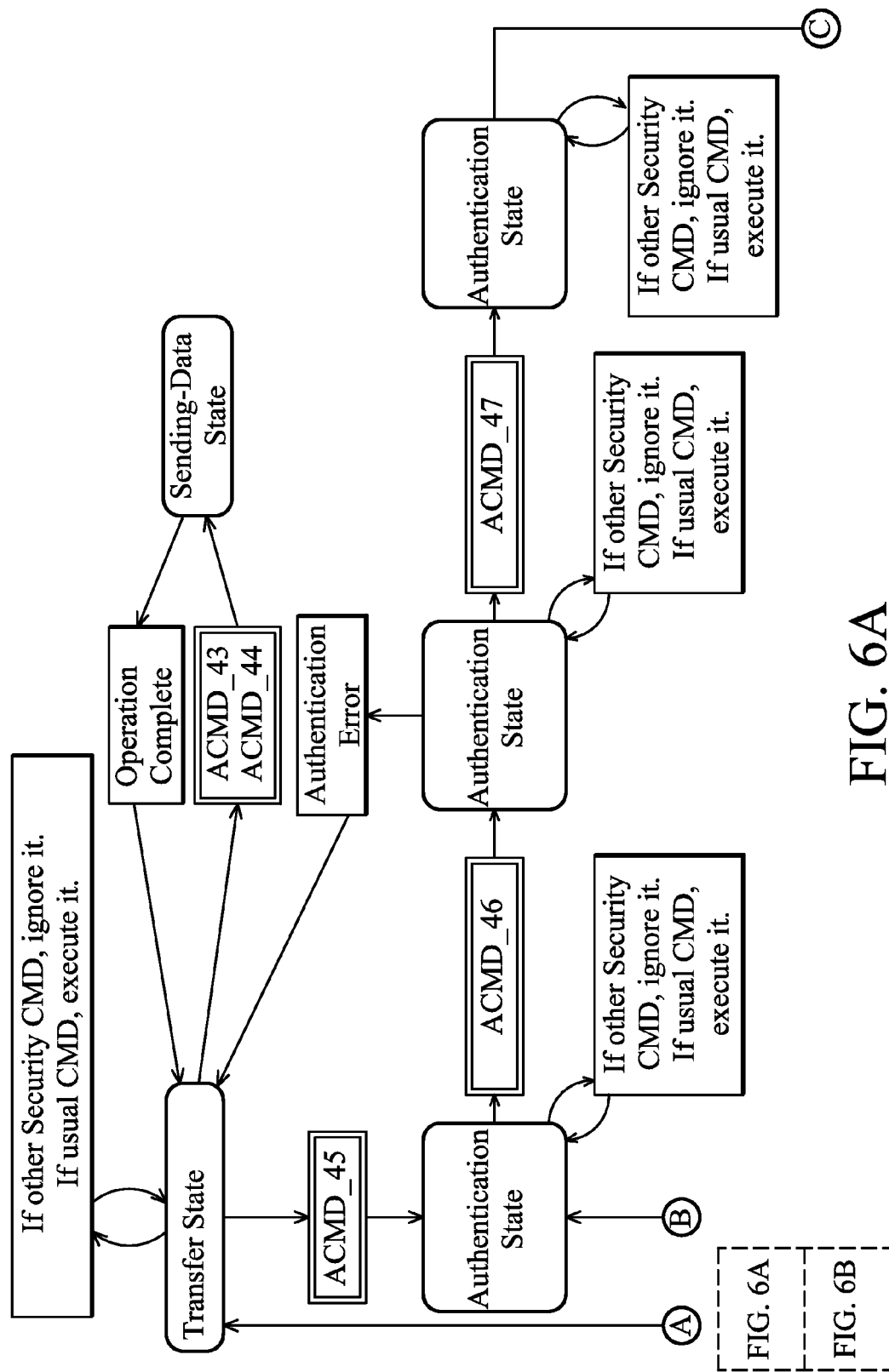
FIGS. 6A and 6B show a state machine diagram for an SD card.
Figure 6B:
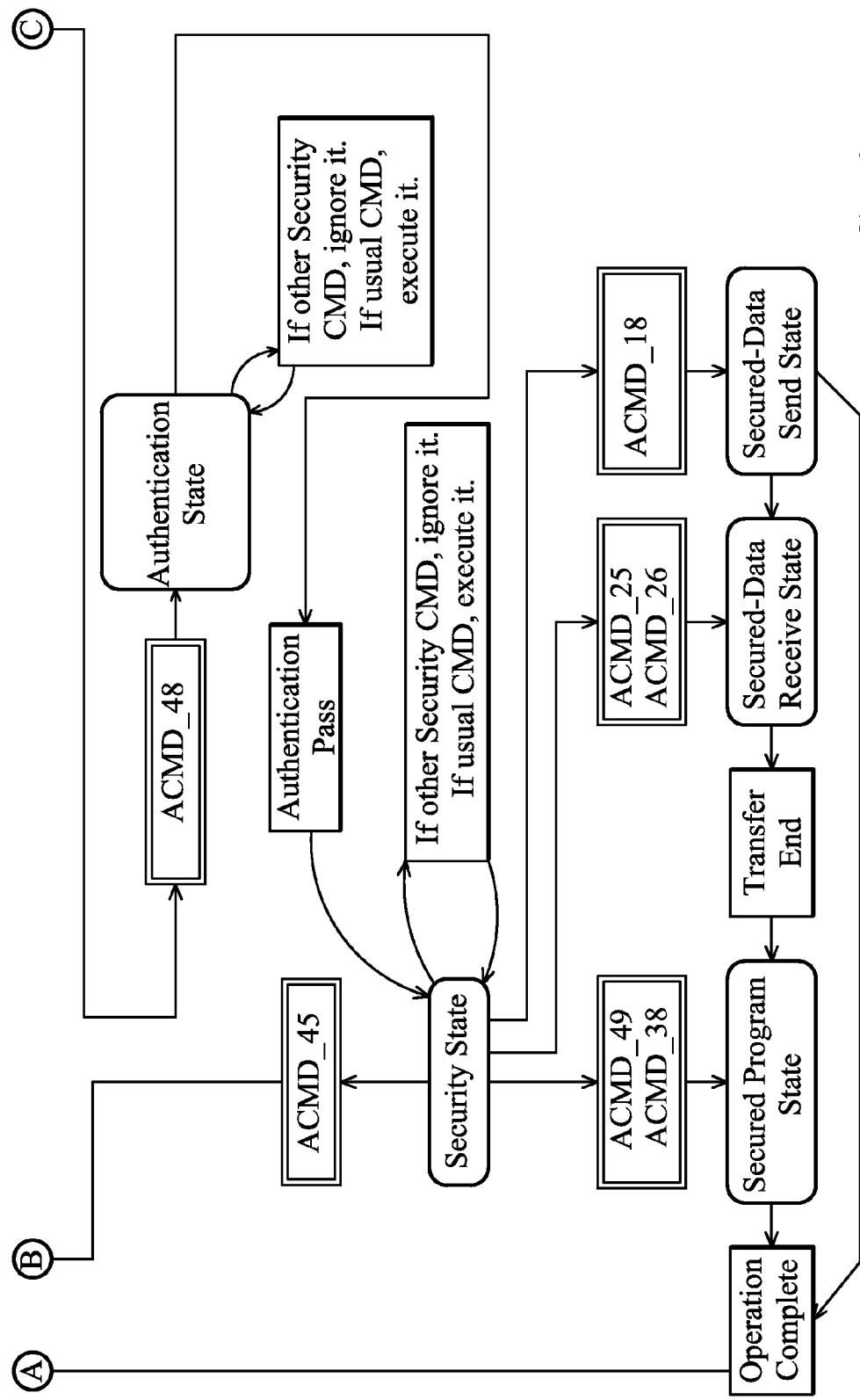

Options for the operation performed in step S514 include:

1. Issue a command for the seventh space cell (Volume+51) of the Flash memory 110, wherein the issued command is regarded as the Change Secure Area command (ACMD_49) to be executed according to the firmware of the SD card 102;

2. Issue a command for the eighth space cell (Volume+40) of the Flash memory 110, wherein the issued command is regarded as the Secure Erase command (ACMD_38) to be executed according to the firmware of the SD card 102;

3. Issue a command for the ninth space cell (Volume+27) of the Flash memory 110, wherein the issued command is regarded as the Secure Write Multi-blocks command (ACMD_25) to be executed according to the firmware of the SD card 102;

4. Issue a command for the tenth space cell (Volume+28) of the Flash memory 110, wherein the issued command is regarded as the Secure Write Media Key Block command (ACMD_26) to be executed according to the firmware of the SD card 102; and 5. Issue a command for the eleventh space cell (Volume+20) of the Flash memory 110, wherein the issued command is regarded as the Secure Read Multi-blocks command (ACMD_18) to be executed according to the firmware of the SD card 102;

FIGS. 6A and 6B depict a state machine diagram for operating the SD card 102. As shown, according to security commands ACMD_43, ACMD_44, ACMD_46, ACMD_47, ACMD_48, ACMD_49, ACMD_38, ACMD_25, ACMD_26 and ACMD_18 issued by the read/write commands to the first to the eleventh space cells of the security command representative space, the SD card 102 is switched between different states such that a CPRM mechanism is operated.

Note that SD card operating methods based on the aforementioned techniques are regarded as being within the scope of the invention. The operating method includes the following steps: allocating a flash memory of an SD card to provide a data storage space and a CPRM support space (referring to the space 114 and the space 116 of FIG. 1); and regarding read/write commands that a host outputs for the CPRM support space as security commands such that a CPRM mechanism is operated over the data storage space. Also note that referring to the aforementioned exemplary embodiments, variants of SD operating methods may be developed.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A Secure Digital card, comprising:
a Flash memory, providing a data storage space and a Content Protection Recorded Media Support Space; and
a controller, executing a firmware and providing read/write commands that a host outputs to the Content Protection Recorded Media support space as security commands such that operate a Content Protection Recorded Media mechanism over the data storage space, wherein:
the Content Protection Recorded Media support space includes a security command representative space representative of the security commands, and each space cell of the security command representative space corresponds to one of the security commands; and
the security command representative space includes:
a first space cell, corresponding to a Get Media Key Block command;
a second space cell, corresponding to a Get Media ID command;
a third space cell, corresponding to a First Random Number Set command in an Authentication and Key Exchange process;
a fourth space cell, corresponding to a Second Random Number Get command in the Authentication and Key Exchange process;
a fifth space cell, corresponding to a Second Response Value Set command in the Authentication and Key Exchange process;
a sixth space cell, corresponding to a First Response Value Get command in the Authentication and Key Exchange process;
a seventh space cell, corresponding to a Change Secure Area command;
an eighth space cell, corresponding to a Secure Erase command;
a ninth space cell, corresponding to a Secure Write Multi-blocks command;
a tenth space cell, corresponding to a Secure Write Media Key Block command; and
an eleventh space cell, corresponding to a Secure Read Multiblocks command.

2. The Secure Digital card as claimed in claim 1, wherein the Content Protection Recorded Media support space further includes:
a Content Protection Recorded Media command control main table, comprising:
an applicationspecific command control table, storing read/write attribution of each of the security commands;
an application-specific command argument, containing parameters of the security commands;
an identifier for application, showing that the Secure Digital card supports the Content Protection Recorded Media mechanism with the Content Protection Recorded Media support space; and
a Content Protection Recorded Media control code, showing whether operating the Content Protection Recorded Media mechanism is allowed.

3. The Secure Digital card as claimed in claim 2, wherein the controller checks the Content Protection Recorded Media control code and the application-specific command control table when receiving a read/write command for one space cell of the security command representative space, and, when it is determined that the Content Protection Recorded Media mechanism is allowed to be operated and the received read/write command conforms to the read/write attribution stored in the application-specific command control table, the controller regards the received read/write command as the security command corresponding to the space cell indicated by the received read/write command.

4. The Secure Digital card as claimed in claim 3, wherein the controller executes a data read/write operation according to the received read/write command when it is determined that the Content Protection Recorded Media mechanism is forbidden or the received read/write command mismatches the read/write attribution stored in the application-specific command control table.

5. A Secure Digital card system, comprising:
   a Secure Digital card as claimed in claim 4; and
   a host, executing an application to operate the Secure Digital card and,
when it is determined that a data storage space of a Flash memory of the Secure Digital card is smaller than the Flash memory and an identifier of a Content Protection Recorded Media command control main table of a Content Protection Recorded Media support space of the Flash memory for the application shows that the Secure Digital card support a Content Protection Recorded Media mechanism with the Content Protection Recorded Media support space, the host sets a Content Protection Recorded Media control code of the Content Protection Recorded Media command control main table to indicate that the Content Protection Recorded Media mechanism is allowed to be operated.

6. The Secure Digital card system as claimed in claim 5, wherein operating the Content Protection Recorded Media mechanism over the data storage space comprises using the host, executing the application to provide the Secure Digital card with read/write commands to the first, the second, the third, the fourth, the fifth and the sixth space cells in order, and later, outputs a read/write command to the seventh, the eighth, the ninth, the tenth or the eleventh space cell.

7. A Secure Digital card operating method, comprising:
   allocating a Flash memory of a Secure Digital card such that the Flash memory provides a data storage space and a Content Protection Recorded Media support space; and providing read/write commands that a host outputs for the Content Protection Recorded Media support space as security commands such that a Content Protection Recorded Media mechanism is operated over the data storage space, wherein:
   the Content Protection Recorded Media support space includes a security command representative space representative of the security commands, and each space cell of the security command representative space corresponds to one of the security commands; and
   the security command representative space includes:
   a first space cell, corresponding to a Get Media Key Block command;
   a second space cell, corresponding to a Get Media ID command;
   a third space cell, corresponding to a First Random Number Set command in an Authentication and Key Exchange process;
   a fourth space cell, corresponding to a Second Random Number Get command in the Authentication and Key Exchange process;
   a fifth space cell, corresponding to a Second Response Value Set command in the Authentication and Key Exchange process;
   a sixth space cell, corresponding to a First Response Value Get command in the Authentication and Key Exchange process;
   a seventh space cell, corresponding to a Change Secure Area command;
   an eighth space cell, corresponding to a Secure Erase command;
   a ninth space cell, corresponding to a Secure Write Multi-blocks command;
   a tenth space cell, corresponding to a Secure Write Media Key Block command; and
   an eleventh space cell, corresponding to a Secure Read Multi-blocks command.

8. The Secure Digital card operating method as claimed in claim 7, using the Content Protection Recorded Media support space to further provide:
   a Content Protection Recorded Media command control main table, comprising:
   an application-specific command control table, storing read/write attribution of each of the security commands;
   an application-specific command argument, containing parameters of the security commands;
   an identifier for application, showing that the Secure Digital card supports the Content Protection Recorded Media mechanism with the Content Protection Recorded Media support space; and
   a Content Protection Recorded Media control code, showing whether operating the Content Protection Recorded Media mechanism is allowed.

9. The Secure Digital card operating method as claimed in claim 8, further checking the Content Protection Recorded Media control code and the application-specific command control table when receiving a read/write command to one space cell of the security command representative space, and when it is determined that the Content Protection Recorded Media mechanism is allowed to be operated and the received read/write command conforms to the read/write attribution stored in the application-specific command control table, the received read/write command is regarded as the security command corresponding to the space cell indicated by the received read/write command.

10. The Secure Digital card operating method as claimed in claim 9, wherein when it is determined that the data storage space is smaller than the Flash memory and the identifier for application shows that the Secure Digital card supports the Content Protection Recorded Media mechanism with the Content Protection Recorded Media support space, the host is operated to set the Content Protection Recorded Media control code to indicate that the Content Protection Recorded Media mechanism is allowed to be operated.

11. The Secure Digital card operating method as claimed in claim 10, wherein the host is operated to provide the Security Digital card with read/write commands to the first, the second, the third, the fourth, the fifth and the sixth space cells in order, and later, to further provide the Security Digital card with a read/write command to the seventh, the eighth, the ninth, the tenth or the eleventh space cell, such that the Content Protection Recorded Media mechanism is operated over the data storage space.

* * * * *